US011348095B2

(12) United States Patent
Fletcher et al.

(10) Patent No.: US 11,348,095 B2
(45) Date of Patent: May 31, 2022

(54) RAPID DISTRIBUTED CONSENSUS ON BLOCKCHAIN

(71) Applicant: nChain Licensing AG, Zug (CH)

(72) Inventors: John Fletcher, London (GB); Thomas Trevethan, London (GB); Marco Bardoscia, London (GB)

(73) Assignee: nChain Licensing AG, Zug (CH)

(*) Notice: Subject to any disclaimer, the term of this patent is extended or adjusted under 35 U.S.C. 154(b) by 396 days.

(21) Appl. No.: 16/604,959

(22) PCT Filed: Apr. 9, 2018

(86) PCT No.: PCT/IB2018/052471
§ 371 (c)(1),
(2) Date: Oct. 11, 2019

(87) PCT Pub. No.: WO2018/189657
PCT Pub. Date: Oct. 18, 2018

(65) Prior Publication Data
US 2021/0119767 A1    Apr. 22, 2021

(30) Foreign Application Priority Data

Apr. 11, 2017   (GB) .................................... 1705867
Apr. 11, 2017   (GB) .................................... 1705868
Apr. 11, 2017   (GB) .................................... 1705869

(51) Int. Cl.
*G06F 21/00*      (2013.01)
*G06Q 20/36*      (2012.01)
(Continued)

(52) U.S. Cl.
CPC ............. *G06Q 20/36* (2013.01); *G06F 21/64* (2013.01); *G06Q 20/065* (2013.01);
(Continued)

(58) Field of Classification Search
None
See application file for complete search history.

(56) References Cited

U.S. PATENT DOCUMENTS 10,269,009 B1    4/2019    Winklevoss et al.
10,805,090 B1    10/2020   Poelstra et al.
(Continued)

FOREIGN PATENT DOCUMENTS

CN    105488675 A    4/2016
CN    106503992 A    3/2017

OTHER PUBLICATIONS

Arvind Narayanan et al: "Bitcoin and Cryptocurrency Technologies", Feb. 9, 2016 (Feb. 9, 2016), XP055442367, pp. 1-308 (Year: 2016).*

(Continued)

*Primary Examiner* — Andrew J Steinle
(74) *Attorney, Agent, or Firm* — Davis Wright Tremaine LLP

(57) ABSTRACT

There may be provided a computer-implemented method. It may be implemented using a blockchain network such as, for example, the Bitcoin network. The computer-implemented method includes i) joining, by a node, a group through transfer of tokens to a public group address to become a group member, the group being associated with a threshold signature scheme for which the node controls a private key share, the transfer of tokens being made on a proof-of-work blockchain network; and ii) cooperating, by the node, with other nodes of the group to achieve a distributed consensus as to the correctness of work product of a proposer in response to a challenge, by a challenger, of that work product, the challenge responsive to a request made by a requester, wherein achieving the distributed consensus includes: a) deploying a ghost chain to achieve the distributed consensus resolving the challenge, the ghost (Continued)

chain being a proof-of-stake blockchain in which miners of the ghost chain are members of the group; and c) terminating the ghost chain upon resolution of the challenge.

15 Claims, 8 Drawing Sheets

(51) Int. Cl.
| | |
|---|---|
| *G06F 21/64* | (2013.01) |
| *G06Q 20/06* | (2012.01) |
| *G06Q 20/38* | (2012.01) |
| *H04L 9/06* | (2006.01) |
| *H04L 9/32* | (2006.01) |
| *H04L 9/08* | (2006.01) |

(52) U.S. Cl.
CPC ....... *G06Q 20/389* (2013.01); *G06Q 20/3829* (2013.01); *H04L 9/0618* (2013.01); *H04L 9/0637* (2013.01); *H04L 9/0825* (2013.01); *H04L 9/0833* (2013.01); *H04L 9/3239* (2013.01); *H04L 9/3247* (2013.01); *H04L 9/3252* (2013.01); *H04L 9/3255* (2013.01); *G06Q 2220/00* (2013.01); *H04L 2209/38* (2013.01); *H04L 2209/463* (2013.01); *H04L 2209/56* (2013.01)

(56) References Cited

U.S. PATENT DOCUMENTS

| | | | |
|---|---|---|---|
| 10,984,470 | B1 | 4/2021 | Winklevoss et al. |
| 2015/0287026 | A1 | 10/2015 | Yang et al. |
| 2016/0012424 | A1 | 1/2016 | Simon et al. |
| 2016/0134593 | A1* | 5/2016 | Gvili .................. H04L 63/0442 713/170 |
| 2016/0321751 | A1 | 11/2016 | Creighton, IV et al. |
| 2016/0330034 | A1* | 11/2016 | Back ..................... H04L 9/3255 |
| 2016/0335533 | A1 | 11/2016 | Davis et al. |
| 2016/0342977 | A1 | 11/2016 | Lam |
| 2016/0344550 | A1 | 11/2016 | Anton et al. |
| 2016/0379212 | A1 | 12/2016 | Bowman et al. |
| 2017/0046638 | A1 | 2/2017 | Chan et al. |
| 2017/0220815 | A1 | 8/2017 | Ansari et al. |
| 2017/0331896 | A1 | 11/2017 | Holloway et al. |
| 2020/0341689 | A1 | 10/2020 | Smith |

OTHER PUBLICATIONS

Dikshit Pratyush et al: "Efficient weighted threshold ECDSA for securing bitcoin wallet", 2017 ISEA Asia Security and Privacy (ISEASP), IEEE, Jan. 29, 2017 (Jan. 29, 2017), pp. 1-9, XP033117504, DOI: 10.1109/ISEASP .2017. 7976994 (Year: 2017).*
Antonopoulos et al., "Bitcoin Book," GitHub, retrieved from https://github.com/bitcoinbook/bitcoinbook, Jun. 8, 2017, 4 pages.
Antonopoulos, "Mastering Bitcoin - Unlocking Digital Cryptocurrencies," O'Reilly Media, Inc., Dec. 20, 2014, 282 pages.
Bitshares, "Delegated Proof-of-Stake Consensus," Bitshares.org, retrieved via the waybackmachine: http://web.archive.org/web/201 61102133058/https://bitshares.org/technology/delegated-proof-of-stake-consensus/, Nov. 2, 2016, 6 pages.
Bitslog, "Drivechains vs Sidechains," Bitslog, retrieved from https://bitslog.com/2016/10/07/drivechains-vs-sidechains/, 2021, 2 pages.
Boneh et al., "Aggregate and Verifiably Encrypted Signatures from Bilinear Maps," retrieved from http://crypto.stanford.edu/~dabo/papers/aggreg.pdf, 2003, 22 pages.
Casper, "How does the Casper proof of stake algorithm work?" retrieved from https://ethereum.stackexchange.com/questions/102/how-does-the-casper-proof-of-stakealgorithm-work, Apr. 28, 2017, 2 pages.
Goldfeder et al., "Securing Bitcoin Wallets via a New DSA/ECDSA threshold signature scheme," manuscript, https://www.cs.princeton.edu/~stevenag/threshold_sigs.pdf, 2015 [retrieved Jun. 21, 2018], 26 pages.
Brahim, "SecureCoin: A Robust Secure and Efficient Protocol for Anonymous Bitcoin Ecosystem," International Journal of Network Security 19(2):295-312, http://ijns.jalaxy.com.tw/contents/ijns-v19-n2/ijns-2017-v19-n2-p295-312.pdf, Mar. 2017, 18 pages.
International Search Report and Written Opinion for Application No. PCT/IB2018/052470, dated Jun. 11, 2018, filed Apr. 9, 2018, 10 pages.
International Search Report and Written Opinion for Application No. PCT/IB2018/052471, dated Jun. 12, 2018, filed Apr. 9, 2018, 11 pages.
International Search Report and Written Opinion for Application No. PCT/IB2018/052472, dated Jun. 11, 2018, filed Apr. 9, 2018, 10 pages.
Lerner, "Rootstock White Paper" retrieved from http://www.theblockchain.com/docs/Rootstock-WhitePaper-Overview.pdf, Nov. 19, 2015,24 pages.
Lewis, "Orisi White Paper," GitHub, retrieved from https://github.com/orisi/wiki/wiki/Orisi-White-Paper, Nov. 29, 2014, 5 pages.
Nakamoto, "Bitcoin: A Peer-to-Peer Electronic Cash System," Bitcoin, Oct. 31, 2008, https://bitcoin.org/bitcoin. pdf, 9 pages.
Narayanan et al., "Bitcoin and Cryptocurrency Technologies," Princeton University Press, Feb. 9, 2016, 308 pages.
Pratyush et al., "Efficient weighted threshold ECDSA for securing bitcoin wallet," 2017 ISEA Asia Security and Privacy (ISEASP), http://ieeexplore.IEEE.org/document/7976994/, Jan. 29, 2017, 10 pages.
Reddit, "How an Anchored Proof of Stake Sidechain Can Help the Bitcoin Main Chain," retrieved from https://www. reddit.com/r/Bitcoin/comments/5vy4qc/how_an_anchored_proof_of_stake_sidec hain_can_help/, Feb. 24, 2017, 9 pages.
Rootstock FAQ, "Roodstock FAQ," retrieved from https://www.rsk.co/faqs, 2018, 9 pages.
Satoshi et al., "Connection Limits," Bitcoin Forum, Aug. 9, 2010, https://bitcointalk.org/index.php?topic=741.0 prev_next=prev, 2 pages.
Stathakopoulou et al., "Threshold Signatures for Blockchain Systems," retrieved from https://domino.research. bm.com/library/cyberdig.nsf/papers/CA80E201DE9C8AOA852580FA004D412F/$File/rz3910.pdf, Apr. 4, 2017, 42 pages.
UK Commercial Search Report dated Apr. 28, 2017, Patent Application No. GB1705869.4, 5 pages.
UK Commercial Search Report dated Jun. 2, 2017, Patent Application No. GB1705867.8, 8 pages.
UK IPO Search Report dated Sep. 15, 2017, Patent Application No. GB1705869.4, 4 pages.
UK IPO Search Report dated Sep. 6, 2017, Patent Application No. GB1705867.8, 6 pages.
Wood et al., "Polkadot: Vision for A Heterogeneous Multi-Chain Framework," retrieved from https://github.com/polkadot-io/polkadotpaper, Sep. 10, 2016, 21 pages.
UK IPO Search Report dated Sep. 15, 2017, Patent Application No. GB1705868.6, 6 pages.
UK Commercial Search Report dated Jun. 5, 2017, Patent Application No. GB1705868.6,6 pages.
Bitfury Group, "Proof of Stake Versus Proof of Work," White Paper, Sep. 13, 2015, 26 pages.

* cited by examiner

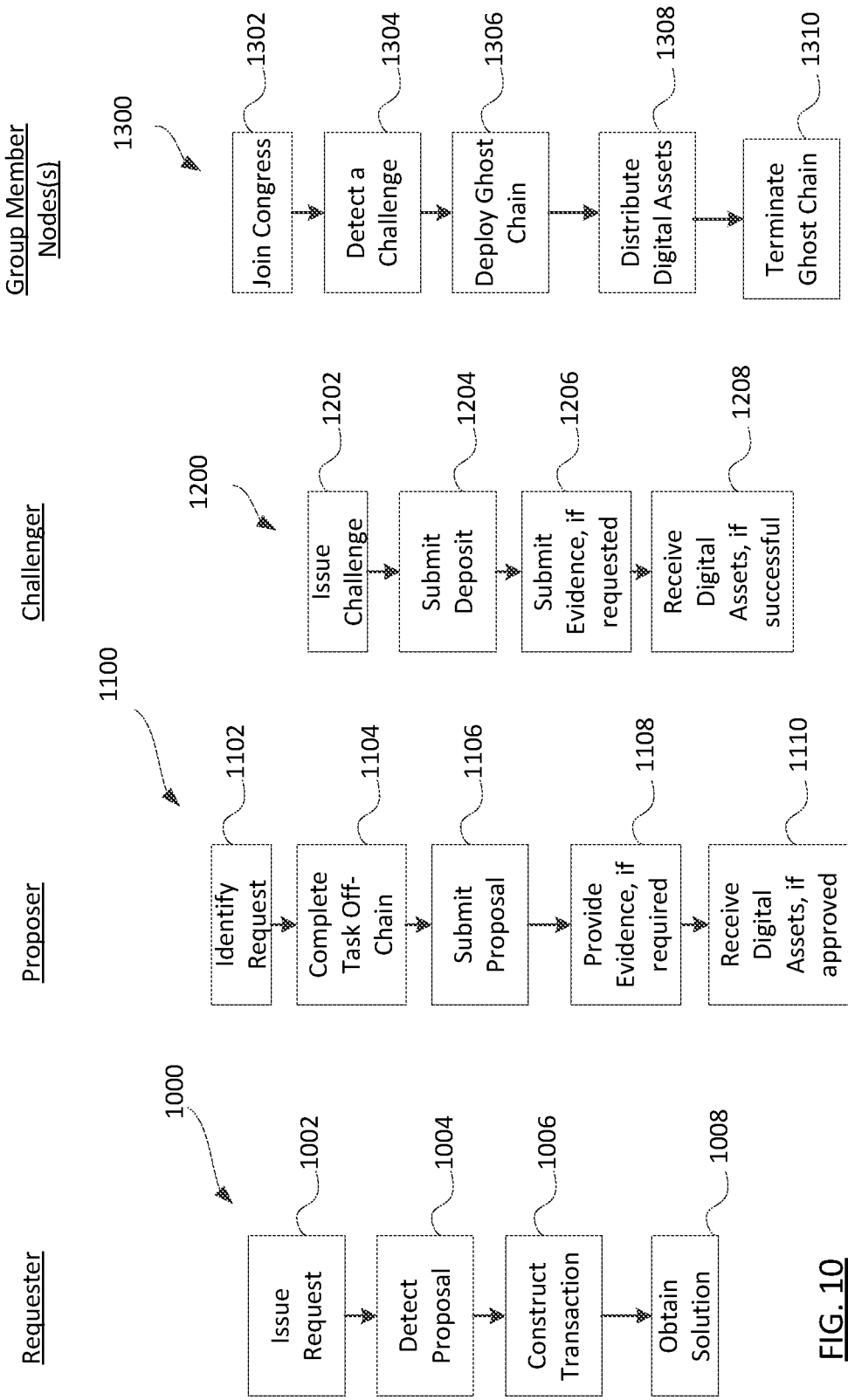

RAPID DISTRIBUTED CONSENSUS ON BLOCKCHAIN

This invention relates generally to distributed systems, and more particularly to methods and systems for distributed consensus with applications to improving reliability in blockchain transactions in distributed systems. The invention is particularly suited, but not limited to, use in improving the reliability of computations in a computation exchange.

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a token between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference and unspent transaction outputs (UTXO). Validation may be performed by executing its locking and unlocking scripts. If execution of the locking and unlocking scripts evaluate to TRUE and, if certain other conditions are met (such as inclusion of a sufficient mining fee), the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

In some such solutions, a distributed consensus may be achieved. For example, unlike many traditional payment systems, blockchain is largely immutable and can often be anonymous. The immutable and largely anonymous nature of blockchain technology present a number of technical challenges when guarding users against malicious behaviour. For example, because a number of blocks built on a block that includes a transaction cause the transaction to be practically irreversible, refunds are often not available and new technical systems are required in order to maintain the integrity of transactions. Such challenges are also difficult due to the decentralized trustless nature of blockchain technology. That is, there is no central party to ensure the integrity of transactions and transaction integrity is instead achieved through technical means. It would, therefore, be desirable for blockchain technology to improve reliability in transactions such as, for example, through employing a digital consensus.

Reliability challenges may be present in computation exchanges, which are sometimes referred to as computation marketplaces. Computation marketplaces are services that allow for off-chain execution of expensive computations. Such exchanges allow a node in a network to outsource the execution of an algorithm to another remote node. The result of the algorithm is then reported back to the node that outsourced the operation of the algorithm. The node receiving the result may not know whether the result is reliable. For the receiving node to determine whether the answer is correct, they would need to execute the algorithm themselves which would defeat the purpose of the outsourcing. It would, therefore, be desirable for blockchain technology to improve the reliability of results in a computation exchange.

Thus, it is desirable to provide improved methods and devices which improve blockchain technology in one or more of these aspects.

Thus, in accordance with the present invention there is provided a method as defined in the appended claims.

Therefore, in accordance with the invention there may be provided a computer-implemented method. The computer implemented method includes: i) joining, by a node, a group through transfer of tokens to a public group address to become a group member, the group being associated with a threshold signature scheme for which the node controls a private key share, the transfer of tokens being made on a proof-of-work blockchain network; and ii) cooperating, by the node, with other nodes of the group to achieve a distributed consensus as to the correctness of work product of a proposer in response to a challenge, by a challenger, of that work product, the challenge responsive to a request made by a requester, wherein achieving the distributed consensus includes: a) deploying a ghost chain to achieve the distributed consensus resolving the challenge, the ghost chain being a proof-of-stake blockchain in which miners of the ghost chain are members of the group; and b) terminating the ghost chain upon resolution of the challenge.

Conveniently, in this way, a distributed consensus may be achieved amongst nodes of a blockchain network. Achieving such a distributed consensus using a ghost chain may be more efficient as compared to a consensus reached using the proof-of-work blockchain.

The ghost chain may be a temporary blockchain. In contrast to a traditional blockchain, the ghost chain may be configured to terminate, disappear and/or expire upon performance or satisfaction of one or more criteria, goal or designated purpose. That is, the ghost chain may be a single-purpose blockchain which ceases to exist once its purpose has been achieved. The ghost chain may include a first block, which may be referred to as a genesis block, which may be created only when the ghost chain is deployed or created for its purpose, criteria or goal.

In some implementations, there is provided a computer-implemented method. The method includes: i) joining, by a node, a group through deposit of digital assets to a public group address to become a group member, the group being associated with a threshold signature scheme for which the node controls a private key share, the deposit of digital assets being made on a proof-of-work blockchain network; and ii) cooperating, by the node, with other nodes of the group to: a) detect a challenge, by a challenger, to work product of a proposer in response to a request made by a requester; b) deploy a ghost chain to resolve the challenge, the ghost chain being a proof-of-stake blockchain in which miners of the ghost chain are members of the group; and c) terminate the ghost chain upon resolution of the challenge.

The computer-implemented method may also include: cooperating with other nodes of the group to construct a transaction, payable to the group (i.e., transferring tokens to the group), with a bounty and proposer deposit as input and the bounty and the proposer deposit and a challenger deposit as output and providing the transaction to the challenger for adding of the challenger deposit as input. The bounty, proposer deposit and challenger deposit are tokens. The bounty and proposer deposit may be placed under exclusive control of the group prior to construction of the transaction. For example, the bounty and proposer deposit may be placed under exclusive control of the group when the challenge is detected within a time period following committal by the proposer to a solution to the request.

In some implementations, the computer-implemented method may also include cooperating with other nodes of the group to, when the challenge is successful: i) transfer at least the challenger deposit to the challenger; and ii) distribute the proposer deposit to miners of the ghost chain in proportion to absolute number of blocks mined.

In some implementations, the computer-implemented method may also include, if the work product of the proposer is determined to be valid: i) transfer the bounty and the proposer deposit to the proposer; and ii) distribute the challenger deposit to miners of the ghost chain in proportion to absolute number of blocks mined.

In some implementations of the computer-implemented method, the transfer may be performed by adding a partial signature, by the node using the private key share to a transaction to which other nodes add partial signatures based on respective private key shares until at least a threshold number of private key shares required under the threshold signature scheme are used to create a valid signature.

In some implementations of the computer-implemented method, deploying the ghost chain to resolve the challenge may include receiving evidence from the proposer and challenger and resolving the challenge based on received evidence. The received evidence may include one or both of a final solution or an intermediate result.

In some implementations of the computer-implemented method, deploying the ghost chain to resolve the challenge may include performing a task associated with the request on the ghost chain to determine a correct solution.

In some implementations of the computer-implemented method, deploying the ghost chain to resolve the challenge may include performing a portion of the task on the ghost chain to determine that one of the proposer or the challenger has erred in an intermediate step of a task associated with the request.

In some implementations of the computer-implemented method, terminating the ghost chain may include transferring information pertaining to the distributed consensus (i.e., resolution of the challenge) to the proof-of-work blockchain network.

In some implementations of the computer-implemented method, terminating the ghost chain may include constructing a terminal block that includes a record of mining fees due for blocks created during a signing of a final transaction.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In accordance with the invention, there may be provided a computer readable storage medium. The computer readable storage medium includes computer-executable instructions which, when executed, configure a processor to perform a method described herein.

These and other aspects of the present invention will be apparent from and elucidated with reference to, the embodiment described herein. An embodiment of the present invention will now be described, by way of example only, and with reference to the accompany drawings, in which:

FIG. 10 is a flowchart of an example requester method for requesting completion of a task.

FIG. 11 is a flowchart of an example proposer method for proposing a solution to a task.

FIG. 12 is a flowchart of an example challenger method for challenging a solution to a task.

FIG. 13 is a flowchart of an example method for arriving at a consensus amongst cooperating nodes responsive to a challenge to a solution to a task.

BLOCKCHAIN NETWORK

Figure 1:
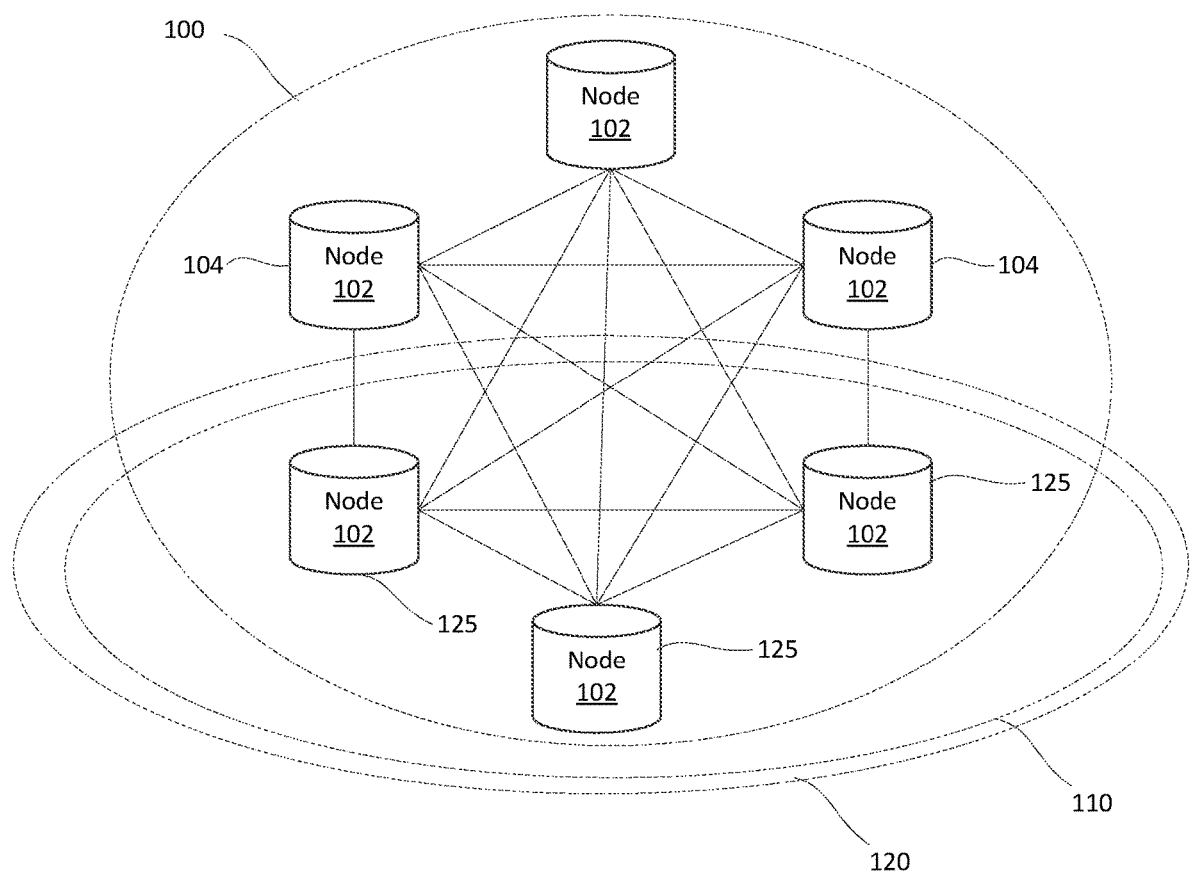
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 is a proof-of-work block chain in which miners 104 perform expensive computations in order to facilitate transactions on the blockchain. For example, the proof-of-work blockchain may require miners to solve a cryptographic problem. In Bitcoin the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring tokens to or from a public key (e.g., paying into the public key) and transferring tokens to or from the address associated with that public key refer to a common operation.

Some of the nodes 102 may not operate as miners and may, instead, participate as validating nodes. Validation of transactions may involve checking signature(s), confirming reference to valid UTXO, etc.

The example of FIG. 1 includes five nodes 102, three of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 is an open-membership group which may be joined by any nodes 102 upon submission of sufficient stake to a pool associated with the congress 110. For example, a node may join a congress through transfer of one or more tokens or digital assets to an account associated with the congress 110. A node 102 joining a congress may be any node in the blockchain network including both mining and non-mining nodes. In at least some applications of a congress, a node acting as a congress member monitors the blockchain in the sense that they download (but not necessarily retain) the full blockchain. Techniques for joining, leaving and participating in a congress 110 will be discussed in greater detail below.

As will be described in greater detail below, members of the congress may form a temporary ghost chain network 120. The ghost chain first blockchain network creates and maintains a distributed ledger which will be referred to as a ghost chain. The ghost chain network 120 may be deployed during a transaction to verify reliability or to arrive at a distributed consensus as to whether a particular purported solution is correct in response to the raising of a challenge to that purported solution. For example, the ghost chain network 120 may be deployed to verify the integrity of processor-generated work product, which may be work product submitted by a node 102 of the blockchain network 100. For example, the ghost chain network 120 may be deployed to arrive at a distributed consensus as to the correctness of a result generated on the blockchain network 100. A dispute as to the correctness of a result may exist where the reliability of processor-generated work product of one node has been challenged by another node.

The ghost chain is a temporary blockchain. Unlike a traditional blockchain, the ghost chain is configured to terminate once it has achieved its purpose. That is, the ghost chain is a single-purpose blockchain which ceases to exist once its purpose has been achieved. The ghost chain includes a first block, which may be referred to as a genesis block, which is only created when the ghost chain is deployed for its purpose (e.g., to verify the integrity of processor-generated work product).

While the blockchain associated with the blockchain network is a proof-of-work blockchain, the ghost chain is a proof-of-stake blockchain. The proof-of-stake based ghost chain network 120 provides an alternative mechanism for achieving consensus. In the proof-of-stake ghost chain, the blockchain is secured by proof-of-stake rather than proof-of-work. Under proof-of-stake, the miners 125 of the ghost chain transfer tokens, holdings of which are represented by way of the digital ledger of the proof-of-work blockchain as security and, the probability of being selected as the node to mine a block is proportional to the quantum of the tokens transferred. Proof-of-stake blockchain systems can be used to avoid the computational expense and energy required to mine on proof-of-work blockchains. Further, proof-of-stake block chains can allow for higher frequency and more regular block creation than proof-of-work blockchains.

A plurality of nodes 102 function as miners 125 of the ghost chain network 120. At least some of the miners 125 of the ghost chain network 120 may not serve as miners 104 of the blockchain network 100. Since the ghost chain network 120 is a proof-of-stake blockchain network, the miners 125 transfer tokens in order to be included as miners. More particularly, the miners 125 for the ghost chain form a bonded validator set in order to mine on the ghost chain network 120. These miners 125 are also members of a congress 110 associated with the blockchain network 100. That is, nodes 102 which are part of both the proof-of-work blockchain network 100 and the ghost chain network 120 act as miners 125 for the ghost chain network 120 and as members of a congress 110 established on the proof-of-work blockchain network 100. These miners 125 join the congress 110 and take part in the congress 110 according to methods described below. Their transfer of tokens into a congress pool is made in the proof-of-work blockchain. That is, the congress members transfer their "stake" on the proof-of-work first blockchain network 100 to the pool to become congress members which allows them to act as miners 125 on the ghost chain by forming a bonded validator set. The congress 110 is an open-membership group which may be joined by any nodes upon submission of sufficient stake to a pool associated with the congress 110.

Electronic Device Operating as a Node

Figure 2:
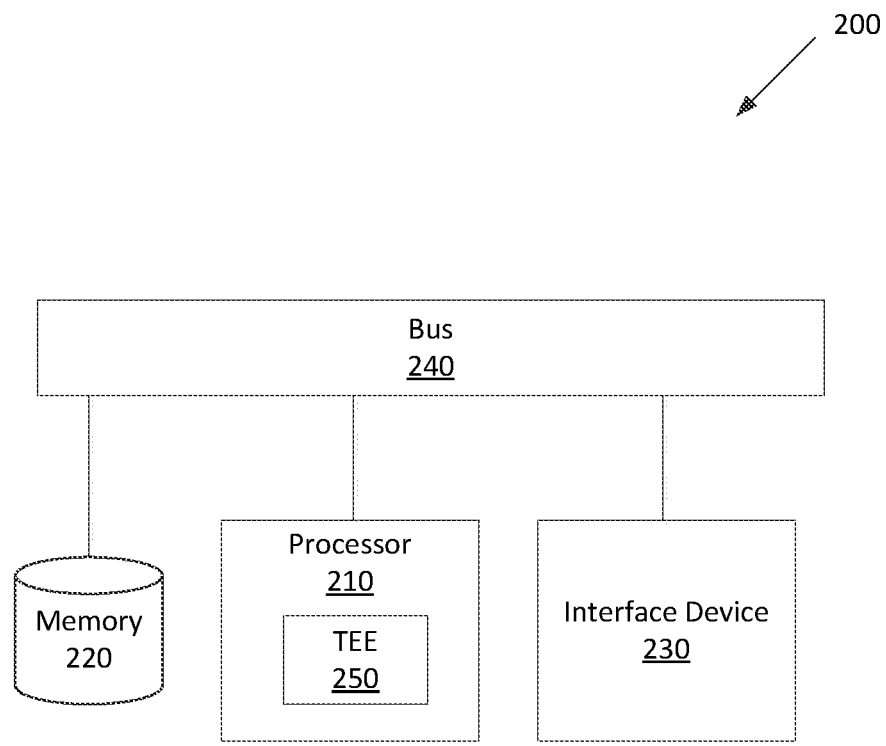
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220 and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks. Further, while a ghost chain is deployed, the memory 220 may store the ghost chain, or a portion thereof.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

The TEE 250 may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The protocol is also robust against the compromise of a threshold of enclaves. Further, the TEE 250 may enable remote attestation which may be used by a node 102 (FIG. 1) to prove to other nodes 102 that a TEE 250 is authentic and is running approved computer executable instructions for a protocol that is implemented by a congress 110. Remote attestation may be provided by the TEE 250 by running a particular piece of code and sending a hash of the code, internal to the enclave, signed by an internal attestation key for the enclave.

The TEE 250 may be used to attest to secure deletion of the private key share when a member of a congress 110 who has previously used the private key share on the electronic device 200 has chosen to leave the congress. The electronic device 200 may signal attestation of deletion to other congress members through a remote attestation protocol provided in the TEE 250. Attestation of deletion may be required before a member is permitted to revert their prior transfer to the congress pool upon becoming a member of the congress. That is, reversion of the transfer may be conditional on attestation to deletion of the private key share held within the member's enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given has of member known as a quote. A third-party attestation service such as Intel Attestation Service (IAS) may certify that these signed statements originate from authentic CPUs conforming to the SGX specification.

The electronic device 200 acts as a node 102 (FIG. 1) in the blockchain network 100 (FIG. 1) and may join and otherwise take part in a congress 110 (FIG. 1). A congress 110 is formed when a group of token bearers pool tokens or other stake or value supported by the blockchain network 100 (FIG. 1).

Congresses and Threshold Signatures

The congress 110 may be a permissioned or non-permissioned group. That is, the congress 110 may be joined by any node 102 (FIG. 1) in the blockchain network 100 (FIG. 1) (i.e., by any node that monitors and stores at least a portion of the information in the blockchain). To join the congress 110, a node 102 transfers one or more tokens to a pool associated with the congress 110 (i.e., to a public group address associated with one or more tokens which are, in turn, associated with other members of the congress). This pool may be referred to as a congress pool. For example, a node 102 may join a congress 110 by transferring such tokens to an address associated with the congress pool (i.e., to a "congress address" which may also be referred to as a public group address). In effect, the transfer acts as a deposit of some digital assets to the congress pool. The tokens are placed under the control of a group threshold signature with a single public key, referred to as a congress public key. Congress members hold distributively-generated private key shares. The number of shares held may be in proportion to the amount transferred to the pool.

The tokens that are controlled by the congress 110, which include any tokens transferred to the congress address, are placed under the control of a threshold signature scheme. Under the threshold signature scheme, a group of members whose total private key share holdings exceed a threshold are needed to produce a valid signature which allows the tokens to be transferred away from control of the congress 110. That is, at least a threshold number of private key shares must be used to generate a valid signature for any outgoing transfer of tokens controlled by the congress 110.

The congress public key encumbers the tokens transferred to the congress pool by the members of the congress 110 in return for private key shares, and any tokens transferred to the address associated with the congress pool (i.e., placed under full, partial or conditional control of the congress) by members or non-members of the congress 110 which have been transferred for reasons other than obtaining private key shares. Non-members or members may transfer tokens to the address associated with the congress for various reasons.

Since the same congress public key may encumber both member transfers (i.e., tokens provided by congress members in return for private key shares) and tokens provided by members or non-members for other purposes, at least some transfers to the address associated with the congress may be specially flagged to indicate the type of transfer. For example, a transaction that transfers the token to the congress address may include a flag, identifier or other attribute which indicates the nature of the transfer being made. By way of example, a transaction that transfers the token to the congress address that is not made for the purpose of joining a congress or boosting a stake in congress membership may include a special identifier to indicate that the transfer is being made for another purpose. Such identifiers may be used by nodes 102 associated with the congress 110 when managing private key generation. More particularly, nodes 102 which transfer tokens for the purpose of joining the group are allocated private key shares for the congress 110 (as a result of making the transfer of tokens) while other nodes 102 which transferred tokens for other purposes (e.g., to transfer to a sidechain) may not hold congress private key shares for the congress (i.e., corresponding to the congress public key).

The congress 110 may act as a self-governing group in which cooperative behaviour is enforced through the threat of confiscation of all or part of the tokens transferred to the pool by a given member. Non-cooperative or malicious members may have such tokens confiscated by participation in a cooperative protocol by a number of honest members. Further, when a congress member wishes to leave the congress 110, they may request a reversion of their transfer (i.e., request that the congress 110 transfer the tokens previously transferred by the member to the pool back to that member's personal address). In effect, such a congress member may request a withdrawal of their prior deposit of digital assets to the pool. However, withdrawal of funds is only performed if a number of private key shares exceeding a threshold required to generate a valid digital signature are used by members of the group (i.e., the congress) to approve the withdrawal.

The threshold signature scheme implemented by the congress 110 may be of various types. The threshold signature scheme allows sharing of signing power between n parties as long as at least a threshold number of private key shares have contributed towards generating a valid signature. Any subset smaller than the threshold cannot generate a valid signature. More particularly, each of the parties controls a share of a private signing key and a threshold number of key shares must be used to generate a valid signature through the combining of partial signatures. Any subset of key shares that is less than the threshold cannot generate a valid signature through the combination of partial signatures.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme", 2003 EIII 46th Midwest Symposium on Circuits and Systems, 1:276-280 (2003). This threshold signature scheme is an extension of a digital signature scheme which is an elliptic curve cryptography based algorithm in which t+1 key shares from a party of n key share holders are required to reconstruct a private key. The scheme may be used to construct a valid signature without having to reconstruct a private key and without any party having to reveal their key share to another party.

Since $t+1$ key shares are sufficient to reconstruct the secret, the maximum number of permissible adversaries according to this technique is t. An adversary, in the model of Ibrahim et al., is an entity who has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim is robust against up to $t<=n/4$ malicious adversaries. This robustness could rise to $t<=n/3$, but at the cost of greater complexity.

The ECDSA scheme of Ibrahim et al. is robust against halting $t<=n/3$ halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share.

The identification of an incorrect share being secretly sent to a node can be rendered publicly verifiable using techniques of Publically Verifiable Secret Sharing (PVSS). Such techniques may avoid a possible delay in the identification of a cheating sender which might occur where PVSS is not used and a recipient of an incorrect share is off line or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., $t+1$) may cooperate to penalize the malicious party. For example, the nodes 102 may take action involving a token (such as tokens or other stake or value) transferred (i.e., deposited)_to the congress by the malicious party. For example, the congress may burn the digital currency, tokens, stake or value by transferring them to an unspendable address or the congress may confiscate such tokens by refusing to authorize their return to the malicious party. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small proportion of malicious adversaries relative to the total number of key shares.

For example, if all nodes have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, which would be quite expensive. Moreover, by carrying out the attack, a large percentage of the value of the stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol, and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against 2t corrupted nodes. Because a signature can be produced if $n-2t>=2t+1$, any qualified subset of key shares of size $2t+1<=(n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSA/ECDSA threshold signature scheme", (2015). This protocol allows $t+1$ parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of t+1 players out of n. Thus, for large values of both n and t, a large number of key shares will need to be stored. To mitigate such storage requirements, standard bitcoin multi-signatures could be combined with threshold signatures. In particular, tokens could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen et al., *Efficient Multiparty Protocols via Log-Depth Threshold Formulae* (2013), Advances in Cryptology—CRYPTO 2013 pp 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 300, 400, 500, 600, 700, 800, 1000 of FIGS. 4 to 8 and 10. Thus, the congress protocol may include one or more of the methods 300, 400, 500, 600, 700, 800, 1000 of FIGS. 4 to 8 and 10. The methods may be performed by a node cooperatively with other nodes associated with other congress members.

Congress Initiation

Figure 3:
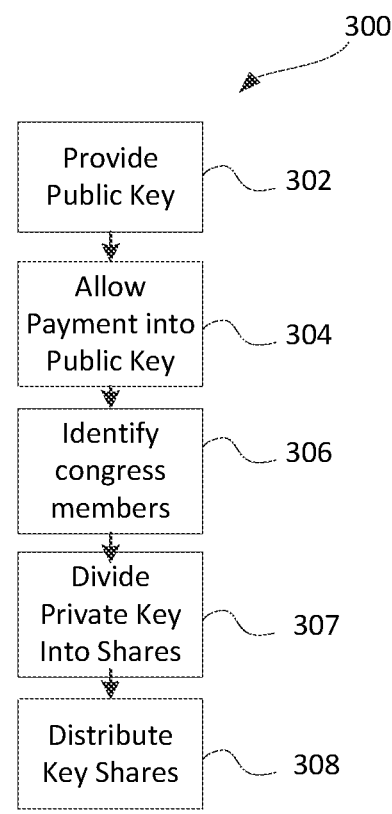
FIG. 3 is a flowchart of an example method of initiating a congress.

Referring now to FIG. 3, a method 300 of initiating a congress 110 is illustrated. The method 300 may be performed by an initially trusted party to set up the congress 110. That is a node 102 associated with the initially trusted party may perform the method 300.

The method 300 includes, at operation 302, providing a congress public key. The congress public key may be provided to other nodes 102 to allow the other nodes to pay into the congress public key if they wish to join the congress. That is, others may transfer tokens to an address associated with the congress public key in order to join the congress.

The node 102 performing the method 300, at operation 304, allows payment into the public key until one or more conditions are satisfied. For example, the node may allow payment into the public key for a determined period of time or for a determined number of blocks. After the condition is satisfied (e.g., after expiration of this period of time or mining of the number of blocks), the node 102 performing the method 300 identifies, at operation 306, initial members of the congress.

After the parties who will comprise the initial membership of the congress are identified, a private key is divided into private key shares according to a threshold signature scheme at operation 307. The private key shares are then distributed, at operation 308, from the node 102 performing the method 300 to the identified parties. The private key shares are associated with a threshold signature scheme, which may be of the type described herein.

During operation 308, the nodes 102 that are identified as congress members cooperate to generate new private key shares and a new public key. The original key shares that were sent to such nodes by the initially trusted party may be used to sign and broadcast a transaction to send all tokens in the congress pool to the new public key, which then becomes the congress public key. That is, during operation 408, a new group public address is established and the tokens under control of the congress are transferred to this new address, which becomes the new address for the group and which is associated with the congress public key. After this transfer is confirmed, the congress can operate trustlessly. The new group public address is formed into which transfers of tokens may be received in the future from other nodes wishing to join the congress 110, or for other purposes as described above. The congress members are now considered to be enrolled in the congress and these nodes can now operate without the aid of the initially trusted party. Moreover, the initially trusted party no longer plays any part in the operation of the congress.

Joining a Congress after the Congress has been Initiated

Figure 4:
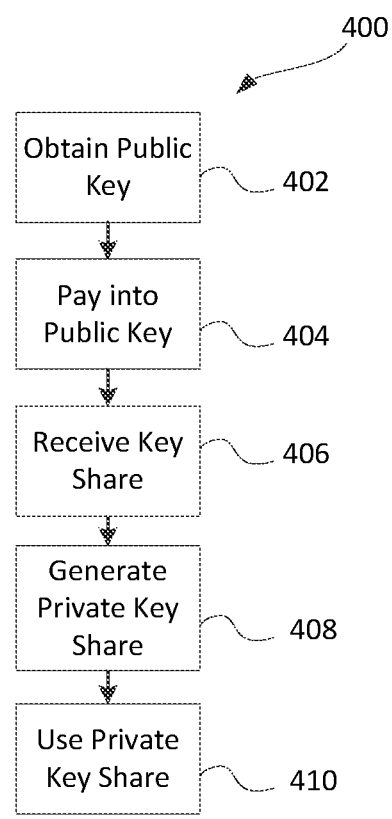
FIG. 4 is a flowchart of an example method of joining a congress.

Reference will now be made to FIG. 4 which illustrates a method 400 of joining a congress. The method 400 of FIG. 4 may operate in conjunction with the method 300 of FIG. 3, but the method 400 of FIG. 4 is performed by a different one of the nodes 102 operating in the same blockchain network 100 (FIG. 1) in which the node performing the method 300 of FIG. 3 operates. The method 400 of FIG. 4 includes, at operation 402, obtaining a congress public key. The congress public key may be obtained directly from the party initiating the congress, such as the node performing the method 300 of FIG. 3, or it may be obtained from a third party including, for example, a third party system operating outside of the blockchain network 100 (FIG. 1). For example, the congress public key may be obtained from a public web server accessible over the public Internet.

The node 102 performing the method 400 pays into the congress public key at operation 404 by broadcasting a transaction of tokens from a private account associated with the node 102 to a congress address (i.e., an address associated with the congress public key). More particularly, the node 102 broadcasts a transaction to transfer one or more tokens to a public group address that is associated with the congress public key. The public group address is the address for a congress pool. The congress pool includes other tokens associated with the other members of a congress. Thus, the transaction at operation 404, once added to a block by a miner 104 (FIG. 1), transfers the token to the congress pool which includes tokens from other members. The public group address may receive both transfers from parties wishing to join the congress and transfers from parties not wishing to join the congress. The parties who do not wish to join the congress transfer the tokens to the congress pool so that such tokens may be placed under total, partial or conditional control by the congress using a threshold signature scheme employed by the congress.

The transaction at operation 404 may include a flag, identifier or other attribute which indicates that the party transferring the token wishes to join the congress and that the transfer is being made for such purpose.

After transferring the tokens to the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective tokens to the public group address.

To regenerate the private key shares, at operation 408, the existing congress members may cooperate to update the key shares. For example, a node 102 may generate a random polynomial of order t and with the constant term zero $f_{n+1}^0(x)$. The node 102 may then calculate the point $f_{n+1}^0$ (n+1) and set this as their private key share. The node 102 may then distribute the points on this polynomial $f_{n+1}^0(i)$ to each of the existing congress members, i=1, . . . n. Each existing congress member (i=1, . . . n) then adds the received value to their existing private key share to obtain the new private key share. The node 102 now has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250.

After the private key share is generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the tokens to be transferred away from the congress. The node 102 performing the method 400 may retrieve the private key share from storage and use the private key share in order to contribute towards signature generation. If a sufficient number of other congress members also use their respective private key to contribute towards signature generation, the signature is generated and a valid outgoing transaction may be broadcast. When a miner 104 (FIG. 1) of the blockchain network 100 adds the transaction to a mined block which is added to the blockchain by consensus of the nodes 102 in the blockchain network 100 and the block is confirmed, the outgoing transaction is complete. At this point, the tokens represented in the transaction may no longer be under the control of the congress. That is, such tokens may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that it cannot retain a copy of the private key if the member wants their transfer back and receive a reversion of their transfer since it must attest to the deletion of the private key before the transfer is reverted.

The method 400 of FIG. 4 may be performed during or after the initial setup phase. That is, the method 400 may be performed before the initial key shares are distributed (e.g., during operation 308 of the method 300 of FIG. 3) or afterward (e.g., during rebalancing, which will be discussed in greater detail below).

The transaction at operation 410 may transfer the token back to the party which originally transferred those tokens to the congress pool. That is, the transfer may return tokens to a that party. The transfer may also transfer the token elsewhere. For example, the token may be transferred to a third party or to an unspendable address.

Confiscation of Tokens

Figure 5:
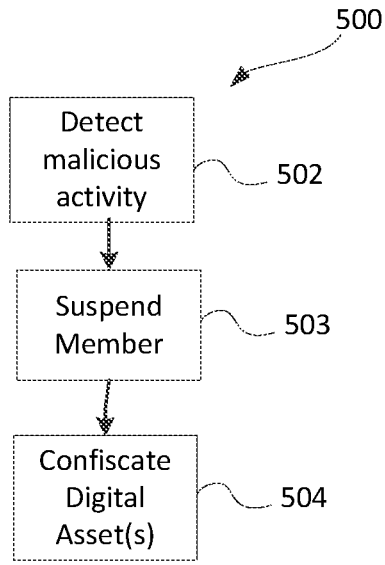
FIG. 5 is a flowchart of an example method of confiscating a token.

Referring now to FIG. 5, an example method 500 of confiscating a token is illustrated. The method 500 of FIG. 5 may be performed by a node 102, which may be the same node performing the method 400 of FIG. 4. The method 500 may be performed after operation 408 of the method 400 of FIG. 4 so that the node 102 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent or otherwise unacceptable information) to other members of the congress, the member may be deemed to be a malicious member.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member transfers into the congress pool may be subject to confiscation. Confiscation means permanently preventing the return of a member transfer that is deemed confiscated. The token(s) that form the member transfer which are not returned due to the malicious activity may be left in the congress pool but not returned, transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction. That is, the node cooperates with other nodes of the congress to confiscate at least a portion of the tokens that were previously transferred to the public group address (i.e., to the congress pool) by the malicious party. That is, in response to observing that the group member is in breach of the pre-defined protocol or criteria, the private key share is utilized to contribute to the authorization of a transaction of one or more tokens that are associated with that group member and that are held in the congress pool.

Since a threshold signature scheme is used with the congress public key, an individual node acting alone cannot transfer another congress member's transfer of tokens away from the congress pool (e.g., to an unspendable address). Rather, the tokens can only be confiscated by transfer when a threshold number of private key shares are used by their respective members to generate a valid signature to transfer the token(s) to another address or when a group of members having at least a threshold number of private key shares reach consensus to suspend a member (at operation 503), which causes any withdrawal request from the suspended member to be automatically ignored. When tokens are confiscated by transfer, the other address to which the token(s) may be transferred may be associated with an unspendable address. For example, the other address may be an address for which no private key exists so that no party can access the tokens bound by the public key for the address. When the tokens are transferred to the unspendable address they may be considered to have been burned, since they are no longer spendable by any members of the congress or indeed by any nodes in the blockchain network 100.

Accordingly, at operation 504, the node may confiscate the token by using the private key share in cooperation with other members of the congress to generate a valid signature for the transaction to the unspendable address.

Further, in some implementations, a congress may serve as a bonded validator set, securing a proof-of-stake sidechain, and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member transfer, made by the malicious member, will be denied and the transfer is considered to be confiscated. All or a portion of the confiscated tokens may be burnt at some time in the future. That is, at some time later, a threshold of members (not including the malicious member) may collaborate to authorize transfer of the confiscated tokens to an unspendable address. Some or all of the tokens may, instead, be sent as a reward to a node who provided evidence of a member's wrongdoing.

Figure 6:
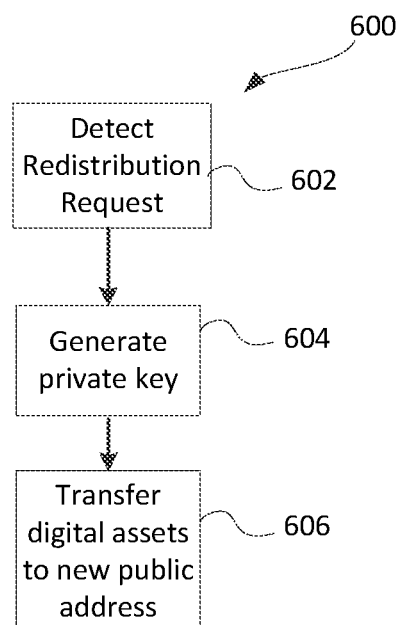
FIG. 6 is a flowchart of an example method of redistributing key shares.

Since the congress is an open group which may be joined by any node 102 of the blockchain network 100 through transfer of tokens, the group membership may periodically change. When such changes occur, the private key share distributions may be updated. Referring now to FIG. 6, an example method 600 of updating private key share distributions is illustrated. The method 600 may be performed by a node 102 of the blockchain network 100 in cooperation with other nodes of the blockchain network 100.

Updating Private Key Share Distributions Using New Public Address

At operation 602 of the method 600, the node 102 detects a redistribution request, which is a request, the fulfilment of which entails a redistribution of key shares. For example, the node 102 may detect that a prospective new member has transferred tokens into the public group address or that an existing member has requested withdrawal of a member transfer.

Tokens may be transferred to the public group address (i.e., to the congress pool) by nodes requesting to join the congress or increase their participation in the congress and by other nodes who are not requesting to join the congress but are instead transferring the tokens to the congress for another purpose (such as to transfer the tokens to a sidechain, as will be described below). At operation 602, the node 102 may identify congress members (i.e., the parties that transferred tokens to the congress public key to join the congress and not for another purpose) using one or more attributes included in at least some of the transactions of tokens to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfilment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated a private key share for use with the new congress public key, they lose the capacity to take part in the congress and are no longer considered congress members.

Further, in response to detecting a redistribution request (which is a request, the fulfilment of which, entails the redistribution of key shares), at operation 606, the node 102 collaborates with other congress members to transfer all tokens in the public group address to a new public address associated with a new public key (which will then become the new congress public key).

Thus, according to the method 600 of FIG. 6, when the distribution of transfers changes or when a request is received from a member to revert a transfer of assets to the pool, private key shares may be regenerated and all of the tokens under control of the congress may be moved to a new public key. The frequency with which memberships of a congress can be updated is limited by the block time of the blockchain network 100. Many applications may only require rebalancing at low frequencies.

Figure 7:
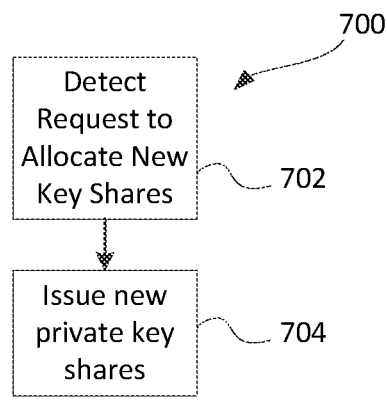
FIG. 7 is a flowchart of a further example method of redistributing key shares.

Updating Private Key Share Distributions while Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time a transfer of tokens to/from the public group address occurs. When a request to allocate a new key share is detected (at operation 702, which may occur through transfer of tokens to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 704, an additional key share may be allocated while other key shares are renewed. Such renewal is required to be accompanied by the attestation to deletion of any key shares of the previous generation.

In this case, new shares may be allocated while maintaining the same threshold (in the context of SSS, this involves sharing on a new polynomial, of increased order).

At operation 702, the node 102 may identify congress members (i.e., the parties that transferred tokens to the congress public key to join the congress and not for another purpose) using one or more attributes included in at least some of the transactions of tokens to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set up phase of the congress. Computations associated with the set up protocol are performed within the TEE enclaves so that no member or former member can derive any information about their own or others private key shares from inter-member communication or any other method. The enclaves within the TEEs enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a prior transfer to the pool made upon a particular member joining the congress can be reverted. More particularly, in order to have such a transfer to the pool reverted, an attestation protocol may require that the TEE enclave attests to the deletion of a key share. Each node 102 may interpret such an attestation as a confirmation that the required deletion has occurred on other nodes through the remote attestation protocol. Thus, the method 700 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

Figure 8:
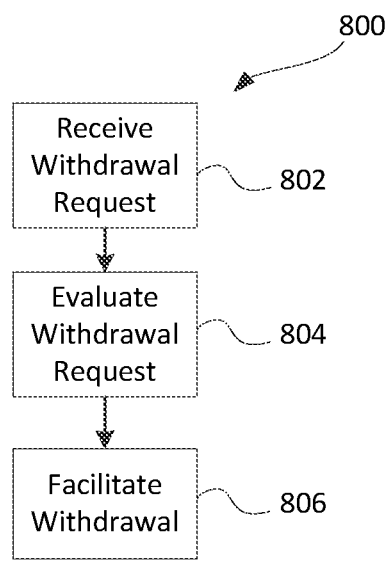
FIG. 8 is a flowchart of an example method of reverting a prior transfer of tokens to a congress.

The method 700 of FIG. 7 avoids having to relock tokens under a new congress public key each time the membership changes. Further, in some circumstances the method 700 may update membership faster than the method 600 of FIG. 6 since, under the method 700 of FIG. 7 a transaction does not need to be added to the blockchain to move all tokens to a new public key because tokens are not moved to a new public key. That is, the membership may be updated using the method 700 of FIG. 7 without having to wait for several blocks to be generated to confirm transfer of the tokens to the new public key since the public key does not change Disenrollment from Congress As noted above, group members may occasionally request to leave the congress and, when a group member disenrolls from a congress, the tokens that they previously transferred to the congress pool may be returned to them. Referring now to FIG. 8, an example method 800 of returning such a transfer is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw tokens previously transferred by the requestor to the pool and currently controlled by the congress. The request may have been broadcast, by the requestor to all congress members.

In response to receiving the request, the node 102, at operation 804, evaluates the request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress key may be used and other tokens under congress control may be transferred to the new congress key.

At operation 804, the evaluation may also consider whether a ghost chain is currently deployed. If a ghost chain is deployed, the withdrawal request is denied until operation of the ghost chain ceases. That is, the congress members who are mining on the ghost chain are prevented from withdrawing their "stake" of tokens at least until the ghost chain terminates.

If the node 102 approves the withdrawal request based on the evaluation, at operation 806 the node facilitates withdrawal of the tokens. That is, the node 102 uses its private key share to cooperatively generate a digital signature and uses the digital signature to transfer the tokens previously transferred by the requestor to the pool back to the requestor. For example, the tokens may be sent back to the address from which they were previously received. Operation 806 is performed in accordance with the threshold signature scheme so that the withdrawal is only effected if at least the threshold number of congress members authorize the withdrawal. Operation 806 is performed after the member who desires to disenroll is suspended from activity for a period of time. This waiting period prevents the member from engaging in misbehaviour while the protocol for reversion of their prior transfer to the pool is being performed.

The congress protocol may be used for a number of different purposes. The congress provides a secure mechanism for performing various functions. The congress may operate trustlessly and provides control of ownership over a token.

The congress protocol may, for example, be used to implement a ghost chain, in which case, the congress protocol may be referred to as a ghost chain protocol.

Ghost Chains

Figure 9:
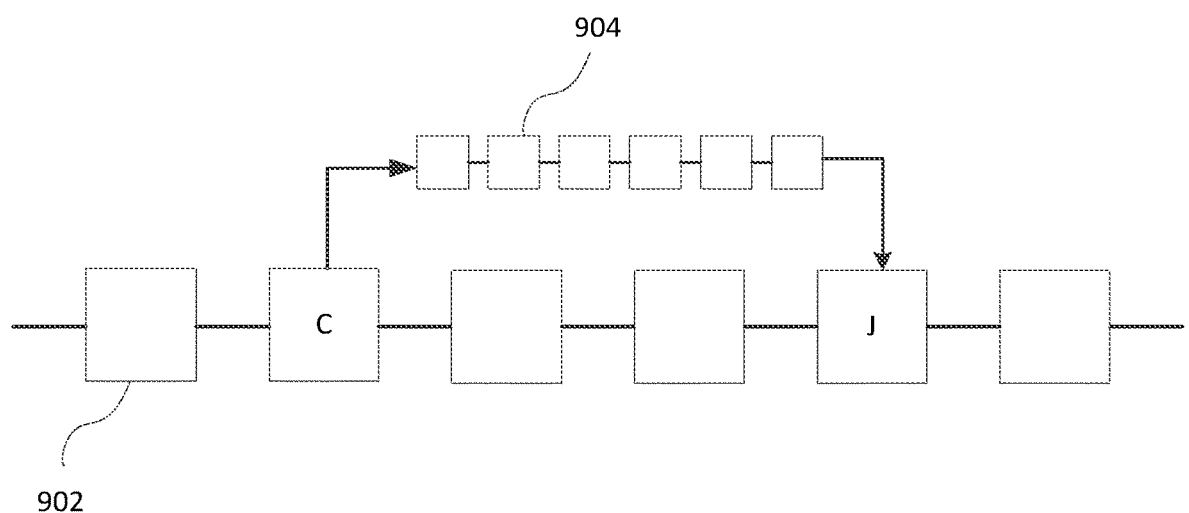
FIG. 9 is a block diagram of an example blockchain and an example ghost chain.

Referring now to FIG. 9, a blockchain 902 and a ghost chain 904 are illustrated. The blockchain 902 is a block-based distributed proof-of-work ledger. The ghost chain 904 is a block-based distributed proof-of-stake distributed ledger that may be used to achieve a distributed consensus amongst nodes of the blockchain. For example, a consensus may be used to a achieve a consensus so as to resolve a dispute between nodes in a blockchain network. For example, the blockchain may include a challenge in which one node challenges work product submitted by another node. Such a challenge is denoted "C" in FIG. 9. The challenge may occur, for example, when a node (i.e., a challenger) indicates that a result proposed in fulfilment of a request is invalid.

When the challenge is issued by a node, the ghost chain 904 is deployed. The ghost chain, is instantiated after the challenge C occurs in response to the challenge. The ghost chain may be instantiated with a genesis block that is the final block (also referred to as a terminal block) from a previous instantiation of the ghost chain. A number of blocks are added to the ghost chain by miners to resolve the digital dispute until the ghost chain reaches a consensus (i.e., a judgment), denoted J.

When a consensus is reached, a transaction (referred to below as a final transaction or settlement transaction) may be constructed and signed (as will be described in greater detail below). This transaction may be a transaction whose effect will be to distribute funds on the main blockchain 902 in accordance with the consensus, distribute funds to remunerate miners of the ghost chain, etc. The transaction may also communicate the consensus result back to the main blockchain 902. More particularly, the results may be encapsulated in the transaction.

After consensus has been reached and the final transaction constructed and signed, the ghost chain 904 terminates and the constructed transaction is mined into the main blockchain 902. Since the ghost chain 904 terminates, it is unlike a typical blockchain in that it has a terminal block. This terminal block, which is the last block in the ghost chain 904 occurs when the consensus is determined and the resulting transaction which distributes funds on the main blockchain 902 in accordance with the consensus, distributes funds to remunerate miners of the ghost chain, etc, is validly signed.

Requester-Proposer-Challenger and Ghostchains

Accordingly, nodes 102 (FIG. 1) in the blockchain network 100 (FIG. 1) may implement a requester-proposer-challenger protocol and/or a ghost chain resolution protocol. Such nodes 102 may include computer-executable instructions stored in memory 220 (FIG. 2) which implement such protocols. Such instructions, when executed by a processor 210 (FIG. 2), cause a node 102 (such as an electronic device 200 of the type described with reference to FIG. 2) to perform one or more methods of the protocols. Such methods may include any one or combination of the methods 1000, 1100, 1200, 1300 of FIGS. 10 to 13.

Reference will now be made to FIGS. 10 to 13 which illustrate methods that may be included in a requester-proposer-challenger protocol and/or a ghost chain resolution protocol. A requester method 1000, illustrated in FIG. 10 may be performed by a requester of a task in a computation exchange. That is, a node 102 which requests completion of a task may perform the requester method 1000 of FIG. 10. The node is a node in a blockchain network 100 (FIG. 1) and the node may be referred to as a requester.

A proposer method 1100 is illustrated in FIG. 11. The proposer method 1100 may be performed by a proposer of a solution to the task. That is, a node 102 which claims to have completed the task may perform the method 1100 of FIG. 11. The node is node in the blockchain network 100 (FIG. 1) and the node may be referred to as a proposer.

A challenger method 1200 is illustrated in FIG. 12. The challenger method 1200 may be performed by a challenger of the solution to the task. That is, a node 102 which challenges the solution put forward by the proposer may perform the method 1200 of FIG. 11. The node is a node in the blockchain network 100 (FIG. 1) and the node may be referred to as a challenger.

An arbitrator method 1300 for achieving consensus amongst nodes is illustrated in FIG. 13. The arbitrator method 1300 is performed by a node of blockchain network, in cooperation with other nodes of the blockchain network so as to achieve a distributed consensus. A node performing the arbitrator method in cooperation with other nodes may be referred to as an arbitrator.

The methods 1000, 1100, 1200, 1300 of FIGS. 10 to 13 are performed cooperatively. For example, the methods collectively provide a requester-proposer-challenger protocol in which a ghost chain in used to ensure the validity of a proposers solution.

At operation 1002 of the requester method 1000 (FIG. 10) a node, which will be referred to as the requester, issues a request. The request is a request to complete a task. For example, the task may be a request for work product. More particularly, it may be a request for processor work product (i.e., for a processor to generate defined work product, such as an output for a computation). The task may be an expensive computation, a task that requires input from an external source such as a financial contract, or a task to produce data having specific properties, such as an algorithm or document. The request offers a bounty in the form of tokens associated with the blockchain network 100 in exchange for successful completion of the task. The request may be issued off of the blockchain (i.e., "off chain"). For example, the request may be issued on a web server accessible via the Internet. The request is defined to be successfully completed either when a candidate solution to the request goes unchallenged for a fixed period of time (which may referred to as a "challenge period") or, in the case of a challenge which is resolved by rerunning the computation on the ghost chain, when a candidate solution is found to match the result of an on-chain computation.

The request (at operation 1002) may be issued in a computation exchange. The computation exchange may be a collection of tasks that are requested. For example, a plurality of tasks may be published in the computation exchange. The tasks may be published by the same requester or by different requesters. The computation exchange allows nodes to offload computations or the performance of algorithms to other nodes.

At operation 1102 of the proposer method 1100 (FIG. 11), a node, which will be referred to as the proposer, identifies the request. The node then proceeds (at operation 1104) to complete the task off-chain. For example, an algorithm, data, or other result requested by the requester may be obtained as work product by a processor.

The proposer may then submit a proposal at operation 1106 of the method 1100 (FIG. 11). The proposal is a claim to have completed the task associated with the request issued by the requester at operation 1002 of the method 1000 of FIG. 10. To submit the proposal, the proposer may send their public key for the blockchain network 100 to the requester. The proposer may also commit to the solution to the task. This commit could be in the form of a hash of the solution (i.e., a hash of the work product, such as the output of a computation or a solution of another type).

The requester receives the proposal at operation 1004 of the method 1000 of FIG. 10. For example, the requester may receive the proposer's public key and the "commit" (e.g., the hash of the purported work product).

In response to receiving the proposal, at operation 1006 of the method 1000 of FIG. 10, the requestor may construct a transaction, T1. The transaction includes the bounty as input. The transaction includes the bounty and also a proposer deposit as output (i.e., T1_out=bounty+proposer_deposit). The transaction, T1, is singed to allow a proposer to add their own input. For example, the transaction, T1, may be signed SIGHASH_ALL|SIGHASH_ANYONECANPAY. SIGHASH_ALL is a default signature hash type which signs the entire transaction except any signature scripts, preventing modification of the signed parts. SIGHASH_ANYONECANPAY is a signature hash type which signs only the current input.

The transaction, T1, is constructed to be unlocked in two ways. After the expiration of a challenge period (described below) it may be unlocked with a signature of the proposer (i.e., a signature corresponding to the public key that the proposer provided to the requester) and the solution corresponding to the commit. For example, the operation code OP_CHECKSEQUENCEVERIFY may be used to lock the transaction for the challenge period but to allow unlocking by the proposer if there is no challenge within this period. The transaction is also constructed to be unlocked with the group signature of the congress 110 (FIG. 1) at any time. That is, the transaction can be unlocked before or after expiration of the challenge period when nodes that are members of the congress cooperate using their respective private key shares to unlock the transaction in accordance with the threshold signature scheme for the congress 110.

The transaction may also include information about the alleged solution such as the commit. For example, the hash of the purported work product may be added to the transaction using the OP_PUSHDATA operation code. More particularly, the hash of the purported work product may be added to a locking script of the transaction. This locking script is configured to be unlocked (after expiration of the challenge period) by an unlocking script that provides a solution that hashes to the hash of the purported work product contained in the locking script.

While not illustrated in FIGS. 10 and 11, the proposer may receive the transaction, T1, constructed at operation 1006 and may add the proposer deposit as an input to the transaction, T1. The proposer broadcasts the transaction to other nodes of the blockchain network 100 (FIG. 1). The transaction is then mined onto the blockchain (i.e., added to a block) so that it is publicly visible.

Once the transaction is mined onto the blockchain, a challenge period is initiated during which any node 102 (FIG. 1) may challenge the proposal submitted by the proposer. If no challenge is issued during the challenge period, the proposer may claim the bounty and the proposer deposit from the transaction T1. The proposer may initiate a timer to track the amount of time remaining in the challenge period and may automatically take action once the challenge period has expired. For example, the proposer may provide work product (which may be referred to as the solution), such as processor work product, to the requester and may unlock the transaction.

The proposer may not provide the solution directly to the requester. Instead, the proposer may provide the solution by embedding the solution in a transaction on the main blockchain network. For example, the proposer may provide the solution in an unlocking script, which unlocks a locking script (in the transaction T1) that encumbers the bounty and the proposer deposit (e.g., in an unlocking script that causes the locking script of T1 to evaluate to TRUE). As noted above, the locking script may be configured to check that the proposed solution in the unlocking script hashes to the value that the requester was previously given by the proposer (i.e., in the "commit"). When the unlocking script successfully unlocks the locking script that encumbers the tokens previously encumbered by the locking script of transaction T1 (i.e., the UTXO of transaction T1), the transaction that contains the unlocking script spends the transaction by encumbering the tokens (i.e., the proposer deposit and bounty) with a new locking script (which may, for example, use the proposer's public key to encumber the tokens so that the proposer now has complete control over the tokens).

As noted above, the transaction, T1, may be constructed to lock the bounty and proposer deposit using the OP_CHECKSEQUENCEVERIFY code. This permits the proposer to automatically claim the bounty and proposer deposit after expiration of the challenge period without further approval from the requester.

It can be noted that, if there is no challenge to the proposer's solution, the complete transaction can be performed on the proof-of-work main blockchain 902 (FIG. 9) without need for execution of a challenge protocol or of a ghost chain protocol.

However, a challenger may issue a challenge during the challenge period. For example, at operation 1202 of the method 1200, a challenger issues a challenge. The challenger may have performed operations similar to operations 1102 and 1104 in the method 1100 of FIG. 11. That is, the challenger may have identified the request and may have completed the task off-chain prior to issuing the challenge at operation 1202. The challenger may also have determined that the challenge should be issued by determining that the challenger's solution differs from that of the proposer. The challenger may, for example, perform a hash of their solution and compare that hash to the hash of the proposer's solution and, if the hashes differ, the challenger may issue the challenge.

At operation 1202 of the method 1200 of FIG. 12, the challenger issues a challenge within the challenge period. The challenger may do so by broadcasting an intention to challenge to the blockchain network 100. When a challenge is issued, a group of nodes may assist in determining validity of solutions.

For example, referring briefly to FIG. 13, which illustrates a flowchart of an arbitrator method 1300, a group of nodes may form a congress, which may be used to reach a distributed consensus such as, for example, when a challenge is raised. The congress is, as noted above, secured by transfer of on a proof-of-work blockchain network. For example, at operation 1302 of the method 1300, an arbitrator performing the arbitrator method 1300 may join a congress. For example, the arbitrator may perform the method 400 of joining the congress described above with reference to FIG. 4. Accordingly, at operation 1302, the arbitrator joins a group, which may be referred to as a congress, through transfer of tokens to a public group address associated with the congress to become a group member. The arbitrator makes this transfer on a proof-of-work blockchain network. As described above, the group is associated with a threshold signature scheme for which the node controls a private key share. The joining of the group (which may also be referred to as enrolment) may, for example, be performed during deployment of a ghost chain. Since FIG. 13 illustrates operation 1302 (joining the congress) as being performed prior to operation 1306 (deployment of the ghost chain), it is performed by a node that joined the congress during a previous deployment of the ghost chain (i.e., not during the deployment at operation 1306). However, operations 1306, 1308 and 1310 could, for example, be performed by nodes that join the group during operation 1306.

At operation 1304, the arbitrator cooperates with other nodes of the group to detect the challenge issued by the challenger at operation 1202 of the challenger method 1200 of FIG. 12. More particularly, the arbitrator cooperates with other nodes of the group to detect a challenge, by the challenger, to work product of a proposer in response to the request made by the requester.

Due to the transaction, T1, discussed above, when a challenge is issued, the group assumes control of the bounty and proposer deposit. That is, the transaction, T1, is constructed to be unlockable by the congress at any time. The bounty and deposit are, therefore, placed under and maintained under control of the group when the challenge is detected within a time period referred to as the challenge time following the committal by the proposer to a solution to the request. Thus, when the challenge is detected, the group has control of the bounty and proposer deposit.

After the group has control of the bounty and the proposer deposit and in response to detecting the challenger, the arbitrator may cooperate with other nodes of the group to facilitate a transfer of tokens by the challenger. For example, in response to detecting the challenge, the congress may construct a transaction, T2 with an input that is equal to the bounty and the proposer deposit (e.g., T2_in=bounty+proposer deposit) and an output that is equal to the sum of the bounty, the proposer deposit, and the challenger deposit (e.g., T2_out=bounty+proposer deposit+challenger deposit). Notably, therefore, the bounty and proposer deposit are placed under exclusive control of the group (as described above) prior to construction of the transaction T2. The transaction, T2, is configured to pay at any time to the group. That is, the transaction, T2, is configured to pay to the congress public key. The transaction, T2, may be signed SIGHASH_ALL|SIGHASH_ANYONECANPAY. The arbitrator, together with other arbitrators, may provide the transaction, T2, to the challenger for adding of the challenger deposit as input. For example, the arbitrator, together with other nodes, may make the transaction, T2, publicly available to other nodes.

After the transaction, T2, is made publicly available, the challenger transfers tokens as an input to the transaction, T2. That is, the challenger transfers tokens (at operation 1204 of the challenger method 1200 of FIG. 12) of tokens and places such deposit under control of the group. More particularly, the tokens transferred (a "challenger deposit") is placed under control of the congress public key. The bounty, proposer deposit and challenger deposit are, therefore, all placed under control of the group and encumbered by the congress public key. As described in greater detail in the description of congresses above, a threshold signature scheme allows a threshold number of members of the congress to use respective private key shares to cooperatively generate a valid signature for transactions involving the bounty, proposer deposit and challenger deposit. The proposer deposit and the challenger deposit may be of equal size.

The challenger may also commit to their challenge solution. For example, the challenger may add a hash of the solution to the transaction, T2, using the operation code OP_PUSHDATA, for example.

The transaction, T2, is broadcast to the main blockchain network and is mined onto the main blockchain network so that the challenger deposit is encumbered by the congress public key. The bounty, proposer deposit and challenger deposit are now placed under the exclusive control of the group.

Thus, the challenger provides evidence of an alternative solution and a deposit to the arbitrator. After the transaction T2 is mined onto the main blockchain network, at operation 1306 of the arbitrator method 1300, the arbitrator cooperates with other nodes of the group to deploy a ghost chain to arrive at a distributed consensus, thereby resolving the challenge. As described above, the ghost chain is a proof-of-stake blockchain in which miners of the ghost chain are members of the group. That is, members of the congress are permitted to mine on the ghost chain. Their member transfer to the pool (i.e., the member deposit) on the proof-of-work blockchain network serves as their stake to allow them to mine on the ghost chain and the probability of any member being selected to mine is proportional to the relative amounts transferred (i.e., the amount of their deposit).

While the ghost chain is deployed (at operation 1306), a genesis block for the ghost chain may be created or obtained by the arbitrator in cooperation with other nodes of the group. The genesis block may be a final block from a last ghost chain deployment (e.g., the terminal block from the last instance that a ghost chain was run and the previous run may have been in response to a past challenge). This block may contain information regarding genesis payments. Genesis payments are transfers of digital tokens, which are yet to be made that are due based on a previous deployment of the ghost chain.

Further, while the ghost chain is deployed, members may be permitted to enrol or may request to disenrol from the group. During the enrolment stage, new members may be enrolled so that they are allocated private key shares (as described above with reference to FIG. 4). The new members are provided with the genesis block (which is authenticated by a threshold of current members) and any subsequent blocks which were generated during the enrolment process.

A pre-disenrollment stage may also be included in the ghost chain run. During this pre-disenrollment stage, any member who has requested to be disenrolled may send attestation to deletion of certain private data. Such attestation is may be required for the reversion of a member's transfer to the pool (i.e., attestation may be required for the return of a member deposit). Any evidence of misbehaviour which may preclude the reversion of a member's prior transfer may be sent at this stage (for example, a newly enrolled member may submit a genesis block that has been precommitted to by a current member or members, but is suspected to be fake). Techniques for disenrolling are described in greater detail above with reference to FIG. 8.

The deployment of the ghost chain may include, by the arbitrator in cooperation with other nodes of the group, an adjudication operation. The adjudication operation may include receiving evidence from the proposer and challenger and resolving the challenge based on the evidence. For example, the received evidence may include one or both of a final solution or an intermediate result. The intermediate result may be the result of a step or a series of steps required to perform the requested task. For example, the intermediate step may be partial work product for the task. The final solution is the final work product that completes the requested task. Evidence may be submitted by the proposer at operation 1108 of the proposer method 1100 of FIG. 11 and by the challenger at operation 1206 of the challenger method 1200 of FIG. 12.

The arbitrator and other nodes of the congress may arrive at a distributed consensus as to the correctness of the solution, thereby resolving the challenge, by performing the task associated with the request to determine a correct solution. For example, the task (e.g., a computation or algorithm) may be performed on-chain (i.e., on the ghost chain itself). The group may determine which of the proposer and challenger solutions is correct by comparing such solutions with its own solution, determined on the ghost chain. During this process, the group members (i.e., the ghost chain miners) perform computations and/or analysis to arrive at a distributed consensus. The group members reach consensus and sign blocks during this process.

To reduce computational requirements and time delays, the group may perform a binary search procedure while using the ghost chain to resolve the challenge. More particularly, the proposer and the challenger may each provide one or more intermediate results for their computation or analysis. Since the input of the computation or analysis is the same for both the proposer and challenger (as it would have been specified by the requester) and since the output is different, there will be a transition between intermediate steps that diverges for the challenger and proposer. Once such a transition is identified, the group may use the ghost chain to perform only the single operation, step or procedure associated with the transition. Thus, the arbitrator, in cooperation with the other nodes may only perform a portion of the task on the ghost chain to determine that one of the proposer or challenger has erred in an intermediate step of a task associated with the request. Under this binary search technique, the group may not identify a correct solution, but may rather identify an incorrect solution. Since the group does not determine the correct solution, the solution that is not identified as being incorrect is not, necessarily, correct.

The arbitrator (in cooperation with other nodes of the group) achieves a consensus while the ghost chain is deployed. In effect, a judgment as to the consensus is reached when the arbitrator and other nodes of the congress resolves the challenge.

After consensus (i.e., a judgment for an arbitration) is reached on the blockchain, the arbitrator cooperates with other nodes of the group to construct a final transaction (to be mined to main blockchain network when fully signed). The final transaction, which may also be referred to as a settlement transaction, may contain various token transfers; for example: (i) bounty+deposit (which may be transferred to a node that has been deemed successful or vindicated in the course of the adjudication); (ii) mining fees (for ghost chain mining already performed); (iii) genesis payments (which are token transfers that are due based on a previous run of the ghost chain and which are determined from the genesis block); and/or (iv) reversion (i.e., return) of tokens transferred to the congress pool for disenrolled members.

This transaction may also contain useful metadata; for example, the settlement transaction may transfer the solution back to the blockchain network. Accordingly, during this process, the group (i.e., the arbitrator in cooperation with other nodes of the group) may commit the consensus result to the blockchain network. The group may also commit, to the blockchain network, a Merkle root hash of intermediate computational states as determined on-chain on the ghost chain.

Accordingly, tokens under group control may be distributed (at operation 1308) by the arbitrator in cooperation with other nodes of the group. The distribution of such tokens is performed according to a threshold signature scheme defined for the congress (i.e., for the group). As noted in the discussion of congresses above, the threshold signature scheme is configured such that at least a threshold number of members are required to generate a valid signature for the congress public key. Accordingly, the arbitrator, together with other nodes of the group (i.e., together with the other arbitrators), may consent to transfer tokens by adding a partial signature to the final transaction using the arbitrator's private key share. Other nodes also add partial signatures using their respective private key shares until at least a threshold number of private key shares required under the threshold signature scheme are used to create a valid signature for the final transaction.

The particular method of distributing the tokens in the final transaction will depend on the consensus result. For example, when the consensus is that the purported solution is incorrect, the arbitrator may cooperate with other nodes to transfer at least the challenger deposit to the challenger and to distribute the proposer deposit to miners of the ghost chain in proportion to the absolute number of blocks mined. When the consensus is that the challenger's solution is to be correct, the bounty may also be transferred to the challenger. Thus, the challenger may receive tokens at operation 1208 of the challenger method 1200 of FIG. 12. However, where a binary search is used so that a correct solution is not identified, the bounty may be returned to the requester who may re-publish the request, allowing the challenger to submit a proposal based on their answer. Alternatively, when the proposer is eliminated through binary search, the requester may treat the challenger's commit as a proposal and may resume operations at operation 1006 of the method 1000 of FIG. 10. That is, the requestor may construct a new transaction, T1, based on the challenger's proposal. This transaction may be as described above with reference to operation 1006 except that the node that was formerly considered to be the challenger is now considered to be the proposer. Thus, a new transaction T1 may be constructed to be unlocked by the challenger after expiration of the challenge period by providing a solution that corresponds to the hash of the solution as provided by the challenger in the transaction, T2, described above.

When the consensus is that work product of the proposer is valid, the arbitrator may cooperate with other nodes to transfer the bounty and the proposer deposit to the proposer and to distribute the challenger deposit to miners of the ghost chain in proportion to the absolute number of blocks mined. Thus, the proposer may receive tokens at operation 1110 of the method 1100 of FIG. 11.

If the consensus is that proposer's solution and the challenger's solution are both incorrect, then half of the challenger deposit and half of the proposer deposit may be distributed to miners in proportion to the absolute number of blocks mined. Any remaining tokens may be returned to the party from which it was received.

The requester receives the solution at operation 1008 of the requester method 1000 of FIG. 10. The method by which the requester receives the solution at operation 1008 may depend on whether a challenge was issued. If, for example, no challenge was issued, the proposer committed the solution to the blockchain using the transaction, T1, described above with reference to operation 1006 of the method 1000 of FIG. 10. If, however, a challenge is issued and if the ghost chain determines a solution to the request, the ghost chain nodes may transmit the solution to the requestor on termination of the ghost chain (e.g, at operation 1310 of the arbitration method 1300 of FIG. 13). The ghost chain protocol may, therefore, cause the nodes participating in the ghost chain to automatically transmit the solution to the requester upon determining the solution.

Further, after consensus is reached on the ghost chain and a transaction is constructed and validly signed, the ghost chain terminates (at operation 1310 of the arbitration method 1300 of FIG. 13). That is, upon resolution of the challenge the ghost chain terminates. When the ghost chain is terminated, information pertaining to the resolution of the challenge may be transferred back to the proof-of-work blockchain network.

When the ghost chain terminates, no further blocks are mined onto the ghost chain. That is, unlike a typical blockchain, the ghost chain has a terminal block. The ghost chain may be implemented as a proof-of-stake blockchain that does not fork. The absence of forks means that there will be a definite terminal block when the ghost chain terminates (i.e., a terminal block that is agreed upon by all nodes of the group). After this terminal block, the ghost chain has served its purpose and is not added to.

As noted previously, when the arbitrators (i.e., the nodes of the congress) reach a consensus, the nodes cooperate to construct a transaction that will be broadcast (at operation 1308) on the mainchain once the transaction a valid signature has been generated through addition of partial signatures according to the threshold signature scheme as described above. Since this transaction is, itself, a multiparty computation, nodes that contribute towards this transaction may expect to be rewarded for taking part in this transaction. However, since the transaction is specified before it is signed, remuneration for taking part in the signing (which may include sending of partial signatures to the ghost chain by way of transactions as well as actually mining the blocks) may be deferred until further ghost chain deployment. Such deferral may be provided for in operation 1310. More specifically, the terminal block may be constructed with information that allows genesis payments to be processed during a future deployment of the ghost chain. Such information may be a record of mining fees which are due for blocks that were created after the final transaction was constructed, such as blocks that were created during the signing of the final transaction. That is, the genesis payments may be defined to reward nodes that contributed towards the signing of the final transaction. The terminal block of the ghost chain will become the genesis block of the next ghost chain run (i.e. the next time a ghost chain is deployed). A record is, therefore, created in the terminal block for future genesis payments.

Note that, according to the implementation noted immediately above, members enrol/disenroll during a ghost chain run—which may be triggered by a challenge. An alternative implementation, would also allow enrolment/disenrollment at regular intervals or under other conditions. This may involve the scheduled run of a ghost chain, specially for this purpose, which would be similar to the ghost chain deployment described above except without the adjudication and consensus stages. In this case, the mining fees could be paid at least partially, from 'enrolment fees' which are required in return for enrolling.

Also note that the method 1300 described above described a ghost chain run which is not a first ghost chain run. That is, the method 1300 described the deployment of a ghost chain that had been deployed at some point in the past such that a terminal block containing genesis payments already exists for the ghost chain. The method 1300 may be modified to allow a first ghost chain to be deployed. For example, the first time that the ghost chain is deployed, the genesis block may be established in another way. For example, the genesis block may be provided by an initially trusted party.

It may be that by using a proof-of-stake based blockchain to reach a distributed consensus (i.e., to arbitrate a challenge), faster consensus can be achieved as compared to attempting to reach such a consensus on the proof-of-work blockchain network since proof-of-stake allows for more regular block generation and can be configured to allow for high-frequency block generation. Further, by performing operations necessary to reach such a distributed consensus on the ghost chain rather than on the main blockchain itself, tasks are pushed off of the main blockchain network so that the main blockchain network is less burdened.

Further, the transient nature of the ghost chain (i.e., the fact that the ghost chain is temporary in nature and terminates) may avoid or reduce the risk of the nothing-at-stake problem that typically affects proof-of-stake blockchain networks. The temporary nature of the ghost chain network allows the congress to require that transfers by the miners of the ghost chain to the congress pool are not reverted until the ghost chain terminates. That is, the congress may be configured to not permit any congress members to achieve a reversion of their prior transfer to the pool (i.e., to withdraw their stake) while the ghost chain is running.

While the examples described above have referred to operation codes available in Bitcoin, the methods described herein may also be used with other types of blockchain networks.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method comprising:
joining, by a node, a group through transfer of tokens to a public group address to become a group member, the group being associated with a threshold signature scheme for which the node controls a private key share, the transfer of tokens being made on a proof-of-work blockchain network; and
cooperating, by the node, with other nodes of the group to achieve a distributed consensus as to correctness of work product of a proposer in response to a challenge, by a challenger, of that work product, the challenge responsive to a request made by a requester, wherein achieving the distributed consensus includes:
deploying a ghost chain to achieve the distributed consensus resolving the challenge, the ghost chain being a proof-of-stake blockchain in which miners of the ghost chain are members of the group; and
terminating the ghost chain upon resolution of the challenge.

2. The computer-implemented method of claim 1, further comprising:
cooperating with other nodes of the group to construct a transaction, transferring tokens to the group, with a bounty and proposer deposit as input and the bounty, the proposer deposit and a challenger deposit as output and providing the transaction to the challenger for adding of the challenger deposit as input,
wherein the bounty, proposer deposit and challenger deposit are tokens.

3. The computer-implemented method of claim 2, wherein the bounty and proposer deposit are placed under exclusive control of the group prior to construction of the transaction.

4. The computer-implemented method of claim 3, wherein the bounty and proposer deposit are placed under control of the group when the challenge is detected within a time period following committal by the proposer to a solution to the request.

5. The computer-implemented method of claim 2, further comprising, cooperating with other nodes of the group to, when the challenge is successful:
transfer at least the challenger deposit to the challenger; and
distribute the proposer deposit to miners of the ghost chain in proportion to absolute number of blocks mined.

6. The computer-implemented method of claim 5, wherein the transfer is performed by adding a partial signature, by the node using the private key share to a transaction to which other nodes add partial signatures based on respective private key shares until at least a threshold number of private key shares required under the threshold signature scheme are used to create a valid signature.

7. The computer-implemented method of claim 2, further comprising, cooperating with other nodes of the group to, if the work product of the proposer is determined to be valid:
transfer the bounty and the proposer deposit to the proposer; and
distribute the challenger deposit to miners of the ghost chain in proportion to absolute number of blocks mined.

8. The computer-implemented method of claim 1, wherein deploying the ghost chain to resolve the challenge comprises receiving evidence from the proposer and challenger and resolving the challenge based on received evidence.

9. The computer-implemented method of claim 8, wherein the received evidence includes one or both of a final solution or an intermediate result.

10. The computer-implemented method of claim 1, wherein deploying the ghost chain to resolve the challenge comprises performing a task associated with the request on the ghost chain to determine a correct solution.

11. The computer-implemented method of claim 10, wherein deploying the ghost chain to resolve the challenge comprises:
performing a portion of the task on the ghost chain to determine that one of the proposer or the challenger has erred in an intermediate step of a task associated with the request.

12. The computer-implemented method of claim 1, wherein terminating the ghost chain comprises transferring information pertaining to the distributed consensus to the proof-of-work blockchain network.

13. The computer-implemented method of claim 1, wherein terminating the ghost chain comprises constructing a terminal block that includes a record of mining fees due for blocks created during a signing of a final transaction.

14. A computer readable storage medium comprising computer-executable instructions which, when executed, configure a processor to perform the method of claim 1.

15. An electronic device comprising:
an interface device;
a processor coupled to the interface device; and
a memory coupled to the processor, the memory having stored thereon computer executable instructions which, when executed, configure the processor to perform the method of claim 1.

* * * * *